Patented Oct. 28, 1952

2,615,858

UNITED STATES PATENT OFFICE 2,615,858

POLYVINYL CHLORIDE ORGANOSOL COMPOSITIONS CONTAINING A NON-VOLATILE EXTRACT OF PETROLEUM

De Loss E. Winkler, Orinda, Calif., assignor to Shell Development Company, San Francisco, Calif., a corporation of Delaware No Drawing. Application February 6, 1950, Serial No. 142,700

10 Claims. (Cl. 260—33.6)

This invention relates to an organosol composition comprising finely divided polymer of vinyl chloride suspended or dispersed in a non-aqueous liquid vehicle. More particularly, the invention pertains to an improved organosol composition containing a substantially non-volatile extract of petroleum.

Vinyl chloride polymers and copolymers of high molecular weight have valuable coating and film-forming properties, but application thereof for such purposes in solution is unsatisfactory because suitable solvents like ketones are relatively expensive and because a solution of workable viscosity contains so little resin. To overcome these difficulties, there were developed compositions known as organosols which are suspensions of finely divided vinyl chloride polymer in a liquid vehicle composed of a substantially non-volatile ester plasticizer and volatile hydrocarbons. The organosols utilizing the cheap hydrocarbons have a high resin or polymer content as well as a workable fluidity. They are used by applying a coating thereof to a surface, permitting or forcing the volatile hydrocarbons to evaporate from the applied film, which hydrocarbons are non-solvents for the polymer, and then baking the residual film of polymer particles suspended in ester plasticizer so that fusion or gelation occurs and a homogeneous mixture is obtained, which mixture, owing to uniform distribution of ester plasticizer therein has the desired flexibility, chemical inertness, and high tensile strength needed for coating and film-forming purposes.

Although the organosol compositions have made more feasible the application of vinyl chloride polymers and copolymers of high molecular weight for coating and film-forming purposes, the organosols of the above-mentioned composition are subject to certain restrictive disadvantages resulting from unfavorable rheological properties. Conventional organosols tend to be thixotropic—i. e., they will not flow readily unless agitated. This adverse property necessitates use of special agitating means during application of the organosols which is generally very undesirable and troublesome in commercial practice. Another disadvantage of conventional organosols is that they continue to become more viscous with passage of time. This increase of viscosity with time causes the organosols to acquire an unworkable fluidity with eventual gelation. The tendency of the suspensions to thicken in this manner hampers storage and shipping thereof with the result that they must be used relatively soon after preparation.

It has now been discovered that organosols with unexpectedly improved rheological properties are obtained by incorporating into the organosol composition a substantially non-volatile extract of petroleum. This petroleum extract is obtained by extracting petroleum with a highly polar solvent such as liquid sulfur dioxide or furfural. In the organosol composition of the invention, the ester plasticizer is partly replaced with the petroleum extract, and in spite of the composition being a dispersion of solid polymer particles in a liquid vehicle, it behaves more like a true liquid. It is free of thixotropicity, and it has marked superiority with respect to storage stability. Even though the presence of the non-volatile petroleum extract is responsible for the improved rheological properties, the ultimate films obtainable from the composition have physical properties which are not grossly altered, and in some respects, are better than the ultimate films obtainable from conventional organosol compositions.

In brief, the organosol composition of the invention comprises finely divided thermoplastic polymer of vinyl chloride having a molecular weight above 20,000 suspended in a homogeneous liquid vehicle containing volatile liquid hydrocarbons boiling within the range of about 35° C. to 250° C., and a plasticizer for the polymer which is ester compatible therewith and petroleum extract obtained by extracting petroleum with a non-reactive highly polar solvent, which ester and extract each boil above 125° C. at 1 mm. Hg pressure. The volatile hydrocarbons are present in the composition in amount of about 50 to 300 parts by weight per 100 parts of the polymer and the plasticizer is present in amount of about 40 to 150 parts by weight per 100 parts of the polymer. The extract constitutes a substantial amount of from about 20% by weight of the total plasticizer up to less than that proportion at which the mixture of the extract and the ester ceases to be compatible with the polymer. This limiting proportion is about 60% to 80% with most esters and extracts.

The petroleum products used in the compositions of the invention are high boiling, substantially non-volatile extracts of petroleum. The extracts are obtained by extracting petroleum with solvents having preferential selectivity for aromatics and naphthenes. To obtain such extracts various non-reactive, highly polar, aromatically preferential solvents are used such as liquid $SO_2$, phenol, cresylic acid, furfural, beta,-beta-dichlorethyl ether, nitrobenzene, and the like. Combination solvents like phenol with cresylic acid, or liquid $SO_2$ with benzene or toluene are sometimes used. The use of the so-called Duo-Sol double solvent process employing mutually immiscible solvents like cresylic acid and propane also gives suitable extracts. Reactive solvents like H₂SO₄ give extracts which are of entirely different character from those obtained with non-reactive solvents. The sulfuric acid extracts are highly unstable materials and, consequently, are unsuitable as a source of the plasticizing material since their instability causes the films obtainable from the compositions to change in time and become hard and brittle.

Preferably extracts of petroleum distillates are used and particularly suitable are Edeleanu extracts of petroleum distillates, i. e., extracts obtained by use of liquid $SO_2$ or liquid $SO_2$ in combination with benzene, etc. The extracts are high-boiling materials which range in general from viscous liquids to soft tar-like materials at ordinary temperature. For use in the composition of the invention, extracts boiling above 125° C. at 1 mm. Hg pressure are employed. There is little change in properties of the plasticized products from the compositions with increasing boiling temperature of the extracts above 125° C. at 1 mm. Hg pressure, although it is desirable to employ extracts boiling below about 400° C. at 1 mm. pressure. The extracts from naphthenic crudes and particularly those from naphthenic California and Gulf Coast crudes are very suitable. Extracts obtained in solvent refining of petroleum for manufacture of lubricating oils are available in large quantities and are well suited for the purpose of the invention, especially those wherein fractions of bulk distillate are subjected to solvent refining. Extracts derived in this manner which boil from about 150° C. to 300° C. under 1 mm. Hg pressure are particularly preferred.

The substances used as plasticizers in combination with the petroleum extract are esters compatible with the polymers and copolymers of vinyl chloride. By compatible is meant those esters which form homogeneous compositions with the polymer. The compatible esters which are used preferably boil above about 125° C. under 1 mm. Hg pressure. For this purpose the phosphoric acid esters of phenols or aliphatic alcohols such as tricresyl phosphate, tritolyl phosphate, trioctyl phosphate, and tributoxy ethyl phosphate are suitable. The alkyl and alkoxyalkyl esters of dicarboxylic acids having the required high boiling point are a preferred class of ester plasticizers. Among representative examples of suitable esters for use in the invention are such compounds as dibutyl phthalate, di-s-butyl phthalate, diamyl phthalate, dioctyl phthalate, di(2-ethylhexyl) phthalate, dibenzyl phthalate, diallyl phthalate, dimethallyl phthalate, butyrin, dibutyl diglycolate, dibutyl adipate, dicyclohexyl phthalate, dicyclopentyl phthalate, dibutyl sebacate, dibenzyl sebacate, dioctyl fumarate, dioctyl maleate, butyl acetylricinoleate, butyl phthallyl butyl glycolate, triethylene glycol dioctanoate, dibutyl cellosolve phthalate, dibutyl carbitol phthalate, polydiethylene glycol sebacate, and the like. Preferably, the compatible esters are liquids at normal temperature (20° C.). It is sometimes desirable to use two or more esters in the composition of the invention. Thus, the esters of sebacic acid have the property of imparting low-freeze resistance to the products of the compositions but they are usually too expensive to be used solely as the ester plasticizer. By employing such an ester in minor amount along with another cheaper ester such as dioctyl phthalate or tricresyl phosphate, freeze resistance is considerably better than with the cheaper ester alone.

The resin constituent of the composition is a thermoplastic polymer of vinyl chloride having 90 to 100% of vinyl chloride units therein and having a molecular weight above 20,000, the molecular weight being measurable by Staudinger's method as described in Ind. Eng. Chem., vol. 36, p. 1152 (1936). The polymer is in a finely divided state of subdivision, usually with a size of less than five microns. Very suitable polymer has particle sizes within the range of about 0.1 to 1 micron. Besides so-called gamma and delta polyvinyl chloride, other suitable resins include copolymers of vinyl chloride with such compounds as vinyl acetate, vinyl proprionate, vinylidene chloride, methyl vinyl ether, acrylonitrile, and methyl acrylate. In all cases, the copolymer contains at least 90% of chemically combined vinyl chloride and has a molecular weight above 20,000. Moreover, it is thermoplastic. The finely divided polyvinyl chloride and copolymers of vinyl chloride are obtainable by polymerization in aqueous emulsion in well known manner. In fact, several grades of the comminuted resin may be purchased on the open market. A copolymer prepared by polymerization in aqueous emulsion and containing about 97% vinyl chloride and 3% vinyl acetate is particularly suitable for use in the compositions of the invention.

Volatile hydrocarbons are employed to impart fluidity to the composition wherein they function as diluents and are non-solvents for the resin particles. They evaporate from the composition after deposit of a film thereof. The hydrocarbons boil within the range of about 35° C. to 250° C. and may be paraffins, cycloparaffins, olefins, cyclo-olefins and/or aromatics in any proportion or composition desired. In general, it is preferred to employ about 30 to 80% aromatic hydrocarbons such as benzene, toluene or xylene in admixture with aliphatic and/or naphthenic hydrocarbons. Although substantially pure aliphatic or naphthenic hydrocarbons such as pentane, hexane, octane, nonane, decane, cyclopentane, methylcyclopentane, cyclohexane, etc. may be used, cheaper petroleum distillates are ordinarily utilized like petroleum naphthas boiling from about 100° C. to 150° C. and containing up to 20% aromatics, or petroleum fractions boiling from about 150° C. to 200° C. and containing about 1% to 5% aromatics. Aromatic petroleum distillate boiling from about 150° C. to 210° C. and containing about 55 to 65% aromatics is useful. Excellent results are obtained with use of about equal parts of xylene, and a petroleum distillate boiling from about 100° C. to 150° C. which contains about 15% aromatics.

As indicated hereinbefore, the proportions of the various constituents in the organosol composition of the invention may be varied considerably. Thus, while the amount of total plasticizer (ester plus non-volatile petroleum extract) per 100 parts of polymer particles may be from about 40 to 150 parts, the proportion employed is largely governed by the particular resin and the properties desired in the ultimate deposited fused film. Films with a combination of very good properties are obtained with use of about 50 to 120 parts of total plasticizer per 100 parts of polymer.

The total plasticizer contains at least 20% non-volatile petroleum extract in admixture with the ester plasticizer to realize the substantial improvement in rheological properties for the organosol composition. In general, however, there is used at least about 35% petroleum extract in the total plasticizer, and preferably, the petroleum extract constitutes the major constituent of the total plasticizer for the resin. Depending upon whether exudation or sweating out of the non-volatile petroleum extract from the deposited and fused film is undesired, the petroleum extract may amount to 60% to 80% of the total plasticizer without such exudation occurring. The limiting permissible proportion will be dependent upon the particular type of petroleum extract, the particular ester, the particular resin and the particular proportion of total plasticizer employed with the resin. Ordinarily, the proportion is less than that at which the mixture of ester and extract ceases to be compatible with the resin, which fact may be ascertained by depositing and fusing a film, allowing the film to stand for 10 days at room temperature (20° C.), and observing by visual examination whether exudation had occurred or by drawing a clean cigarette paper across the surface under pressure of a finger. Freedom from an oily marking on the paper indicates absence of exudation or sweating out. As noted, the limiting permissible proportion of extract is dependent upon several factors. With polyvinyl chloride and an Edeleanu extract of petroleum boiling at about 185° C. to 280° C. at 1 mm. Hg pressure, it is 60% with dibutyl or dibenzyl sebacate, 70% with dioctyl phthalate, and 80% with tricresyl phosphate when in each case 60 or 80 parts of total plasticizer per 100 parts of polymer are used. With a copolymer of 95% vinyl chloride and 5% vinyl acetate employed with the same extract, the permissible limit is 80% with dioctyl phthalate when 60 or 80 parts of total plasticizer per 100 parts of resin are used, while with tricresyl phosphate the limit is 70% when 60 parts and 60% when 80 parts of total plasticizer per 100 parts of resin are employed.

The fluidity desired for the composition is the primary factor governing the proportion of volatile hydrocarbon diluent therein. While about 50 to 300 parts by weight per 100 parts of polymer particles are suitable, it is ordinarily preferred to have present about 80 to 120 parts. Excellent results are obtained with about equal parts by weight of volatile hydrocarbons and polymer.

The organosol composition of the invention may be compounded or have the ingredients thereof mixed in any suitable manner. In general, it is preferred to subject the mixture of all components to mechanical grinding in a ball mill for about 20 to 100 hours without heating at ordinary temperature.

The organosol is applied to surfaces or to absorbent sheeting such as cotton fabric by spreading, spraying, dipping or brushing. The applied coating is cured by baking wherein the volatile hydrocarbon diluent is evaporated and the polymer is fused with the plasticizer to form a strong cohesive adherent film. While the baking may be effected at one temperature such as from about 170° C. to 200° C., better results are attained by first baking at a temperature below the fusion point of polymer and plasticizer mixture whereby substantially all of the volatile hydrocarbon is evaporated, and then baking at the higher fusion temperature. Thus, the applied coating may be baked at about 80° C. to 120° C. for 1 to 5 minutes in the first step, and then baked at about 170° C. to 200° C. for 3 to 15 minutes in the second step to complete the cure.

In order to assist in obtaining continuous coherent films, it may be desirable to include a small proportion of an active volatile solvent for the vinyl chloride polymer in the organosol. For this purpose, there may be added about 2 to 10 parts of butyl acetate, methyl ethyl ketone, methyl isobutyl ketone, mesityl oxide, cyclohexanone and/or isophorone per 100 parts of polymer. The inclusion of a small proportion of a solution of soluble resin is also helpful for the same purpose such as low molecular weight vinyl chloride-vinyl acetate copolymer, or polymer of methyl acrylate or methacrylate. It is, of course, necessary that the proportion of solution of soluble polymer be not so high that the viscosity of the organosol be unduly increased.

If desired, the organosol composition of the invention may contain, besides the aforementioned essential ingredients, pigments, dyes, waxes and polymer stabilizing agents as used in conventional organosols and vinyl resin finishes.

The unexpected improvement in rheological properties realized for the organosol compositions of the invention will be more evident from the results of comparative tests on a few representative compositions. In the compositions, the petroleum extract was an Edeleanu extract of petroleum vacuum distillate fractions from California crudes having a specific gravity (20/4) of 1.03, a boiling range of about 182° C.–281° C. at 1 mm. Hg pressure, and a viscosity at 210° F. of about 20 centistokes. Petroleum naphtha used in the compositions had a boiling range of 102° C.–147° C. and contained about 15% aromatics. The resin constituent was Vinylite VYNV-1, a finely divided copolymer containing about 97% vinyl chloride and 3% vinyl acetate with a molecular weight of about 140,000.

Organosol compositions were prepared using as plasticizer the indicated PHR (parts by weight per 100 parts of resin) of extract and di(2-ethylhexyl) phthalate in Table I. The composition also contained 50 PHR of xylene and 50 PHR of the above-noted petroleum naphtha. The mixtures were separately pebble milled at room temperature for 24–48 hours and then the viscosity was determined with a capillary tube viscosimeter. Owing to the fact that the organosol compositions containing no petroleum extract as plasticizer were thixotropic, it was not possible to measure the viscosity thereof. The organosols were then spread on glass plates with an 8 mil doctor blade and baked for 10 minutes at 180° C. The formed films were stripped from the plates for determination of the tensile strength and modulus by standard A. S. T. M. methods.

*Table I*

| Plasticizer | | Viscosity of Organosol, Centipoises | Film Data | |
|---|---|---|---|---|
| Extract, PHR | Dioctyl Phthalate, PHR | | Tensile Strength, lbs./sq. in. | Modulus at 100% Elong., lbs./sq. in. |
| 0 | 60 | Thixotropic | 5,100 | 186 |
| 18 | 42 | 85 | 4,960 | 199 |
| 30 | 30 | 55 | 5,200 | 640 |
| 0 | 80 | Thixotropic | 3,910 | 105 |
| 24 | 56 | 84 | 4,770 | 137 |
| 40 | 40 | 49 | 2,770 | ------ |
| 0 | 100 | Thixotropic | 3,540 | 119 |
| 30 | 70 | 88 | 4,310 | 102 |
| 50 | 50 | 46 | 4,400 | ------ |
| 70 | 30 | 67 | 4,690 | 160 |

The much improved stability against increase in viscosity of the organosol compositions containing the non-volatile petroleum extract is evident from the data given in Table II. The organosols were prepared from Vinylite VYNV-1 using 50 PHR of xylene, 50 PHR of the petroleum naphtha, and the varying amounts of di(2-ethylhexyl) phthalate and the above-noted petroleum extract as plasticizer. The mixtures were ball milled for 48 hours at room temperature.

In order to obtain measurement of the organosol containing only dioctyl phthalate which was thixotropic, the viscosities were measured with a Brookfield Synchro-Lectric Viscosimeter which employs a rotating spindle and thus keeps the sample agitated. The viscosity values were obtained at room temperature with a No. 3 spindle at 60 R. P. M., the organosols having been stored at room temperature for the noted times.

Table II

| Extract, PHR | 0 | | 30 | | 60 | |
|---|---|---|---|---|---|---|
| Dioctyl Phthalate, PHR | 60 | | 50 | | 40 | |
| Time | Viscosity, Centipoises | Viscosity Increase | Viscosity, Centipoises | Viscosity Increase | Viscosity, Centipoises | Viscosity Increase |
| | | Percent | | Percent | | Percent |
| Original | 110 | | 100 | | 90 | |
| 1 week | 200 | 82 | 120 | 20 | 110 | 22 |
| 1 month | 360 | 228 | 200 | 100 | 170 | 89 |

The retention of favorable physical properties for the ultimate films obtainable from the composition of the invention is evident from the results of tests given in Table III. The formula of the compositions was as follows wherein the parts are by weight:

Component: Parts
Vinylite VYNV-1 _____ 100
Xylene _____ 50
Petroleum naphtha _____ 50
Methyl isobutyl ketone _____ 5
Stabilizer _____ 2
Plasticizer (see Table III).

The mixtures were ball milled for 90 hours at room temperature. The resulting organosols were spread on ferro-type steel plates with an 8 mil doctor blade and the films cured by baking for 3 minutes at 100° C. and then 5 minutes at 180° C. The fused films were stripped from the plates and the tensile strength and ultimate elongation determined by standard A. S. T. M. methods.

| Plasticizer | | Tensile Strength, lbs./sq. in. | Ultimate Elongation, Percent |
|---|---|---|---|
| Extract | Dioctyl Phthalate | | |
| 0 | 40 | 3,840 | 230 |
| 15 | 35 | 4,020 | 335 |
| 30 | 30 | 4,425 | 280 |
| 45 | 25 | 3,535 | 230 |
| 60 | 20 | 3,600 | 290 |

Table III

I claim as my invention:

1. An organosol composition comprising finely divided thermoplastic polymer of vinyl chloride containing at least 90% vinyl chloride units therein and having a molecular weight above 20,000 suspended in a homogeneous liquid vehicle containing volatile liquid hydrocarbons boiling within the range of 35° C. to 250° C., and a plasticizer for said polymer which is an ester compatible therewith and a petroleum extract obtained by extracting petroleum with a non-reactive highly polar solvent, which ester and extract each boil above 125° C. at 1 mm. Hg pressure, said hydrocarbons being present in amount of 50 to 300 parts by weight per 100 parts of said polymer and said plasticizer being present in amount of 40 to 150 parts by weight per 100 parts of said polymer, and said extract constituting from 20% of said plasticizer up to less than that proportion at which the mixture of said extract and said ester ceases to be compatible with said polymer.

2. In an organosol composition wherein finely divided thermoplastic polymer of vinyl chloride having a molecular weight of at least 20,000 is suspended in a homogeneous liquid vehicle containing a substantial proportion of volatile hydrocarbons boiling within the range of 35° C. to 250° C. and an ester compatible with said polymer, which ester boils above 125° C. at 1 mm. Hg pressure, the improvement which comprises having present in said composition a petroleum extract obtained by extracting petroleum with a highly polar solvent, which extract boils above 125° C. at 1 mm. Hg pressure, and the weight ratio of said extract to said ester in the composition being at least 1:4, but less than that ratio at which the mixture of said extract and said ester ceases to be compatible with said polymer.

3. An organosol composition comprising minute particles of thermoplastic polymer of vinyl chloride containing at least 90% of vinyl chloride units therein and having a molecular weight above 20,000 suspended in a homogeneous liquid vehicle containing volatile liquid hydrocarbons boiling within the range of 35° C. to 250° C., and a plasticizer for said polymer which is an ester compatible therewith and a petroleum extract obtained by extracting petroleum with a non-reactive highly polar solvent, which ester and extract each boil above 125° C. at 1 mm. Hg pressure, said hydrocarbons and said plasticizer being present in amounts of about 80 to 120 parts and 50 to 120 parts by weight, respectively, per 100 parts of said polymer, and said extract constituting from 20% of said plasticizer up to less than that proportion at which the mixture of said extract and said ester ceases to be compatible with said polymer.

4. An organosol composition as defined in claim 3 wherein the petroleum extract is an Edeleanu extract of petroleum and the ester is a dialkyl ester of a dicarboxylic acid.

5. An organosol composition as defined in claim 3 wherein the polymer is a copolymer containing chemically combined monomer units consisting of vinyl chloride and vinyl acetate, the petroleum extract is an Edeleanu extract of petroleum boiling from about 150° C. to 300° C. under 1 mm. Hg pressure, and the ester is di(2-ethylhexyl) phthalate.

6. An organosol composition as defined in claim 3 wherein the polymer is a copolymer of vinyl chloride and vinyl acetate containing about 97% of vinyl chloride units and the remainder being vinyl acetate units, the petroleum extract is an Edeleanu extract of petroleum boiling from about 150° C. to 300° C. under 1 mm. Hg pressure, the ester is di(2-ethylhexyl) phthalate, and the volatile hydrocarbons are a mixture of xylene and petroleum naphtha boiling from about 100° C. to 150° C.

7. An organosol composition as defined in claim 3 wherein the petroleum extract is a furfural extract of petroleum boiling from about 150° C. to 300° C. under 1 mm. Hg pressure, and the ester is di(2-ethylhexyl) phthalate 8. An organosol composition as defined in claim 3 wherein the ester is dibutyl phthalate.

9. An organosol composition as defined in claim 3 wherein the polymer is polyvinyl chloride.

10. An organosol composition as defined in claim 3 wherein the polymer is polyvinyl chloride and the ester is di(2-ethylhexyl) phthalate.

DE LOSS E. WINKLER.

REFERENCES CITED

The following references are of record in the file of this patent:

UNITED STATES PATENTS

| Number | Name | Date |
| --- | --- | --- |
| 2,210,434 | Rosenthal | Aug. 6, 1940 |
| 2,431,078 | Powell et al. | Nov. 18, 1947 |

FOREIGN PATENTS

| Number | Country | Date |
| --- | --- | --- |
| 562,956 | Great Britain | July 24, 1944 |